United States Patent Office 3,154,591
Patented Oct. 27, 1964

3,154,591
PREPARATION OF 1,4,5,6,7,7-HEXACHLORO-2-ETHYNYLBICYCLO-(2.2.1)-HEPTENE-5
Paul E. Hoch, Youngstown, N.Y., assignor to Hooker Chemical Corporation, Niagara Falls, N.Y., a corporation of New York
No Drawing. Filed Dec. 19, 1958, Ser. No. 781,469
2 Claims. (Cl. 260—648)

This invention relates to a new composition of matter. More particularly this invention relates to the new chemical compound 1,4,5,6,7,7-hexachloro - 2 - ethynylbicyclo-(2.2.1)-heptene-5, having the empirical formula $C_9H_4Cl_6$, a boiling point of 103 to 106 degrees centigrade at 1.5 millimeters pressure and having a chlorine content of 66.0 percent.

The compound of the present invention may be prepared by dehydrohalogenation of 1,4,5,6,7,7-hexachloro-2-(2,3-dichloroethyl)-bicyclo-(2.2.1)-heptene-5. More particularly the compound of this invention may be prepared by heating 1,4,5,6,7,7-hexachloro-2-(2,3 - dichloroethyl) - bicyclo-(2.2.1)-heptene-5 in an alcoholic solution containing an alkali metal hydroxide, preferably sodium or potassium hydroxide. The reaction may be shown as follows:

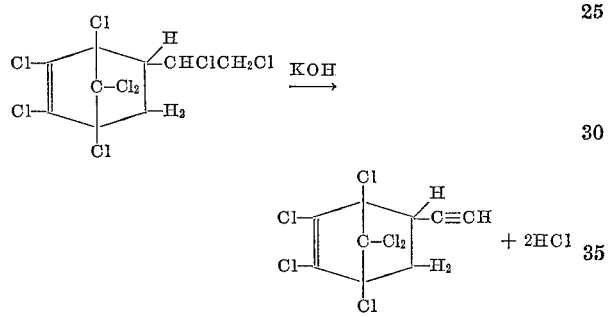

The starting material may be prepared by the Diels-Alder adduction of hexachlorocyclopentadiene as the diene and either trans, 1,4-dichlorobutene-2 or 3,4-dichlorobutene-1 as the dienophile. Equimolar quantities of the diene and the dienophile are reacted together at reflux until the pot temperature reaches about 170 degrees centigrade, generally in 18 to 20 hours. The heating is continued for an additional 3 to 4 hours, and the reaction mixture distilled to remove unreacted starting materials and product.

A solvent should be used in the preparation of the compound of the present invention. At least the major part of the solvent used should consist of an alcoholic solvent in order to establish the necessary basic medium for the reaction. The lower molecular weight alcoholic solvents, such as ethanol or methanol, are preferred due to the fact that the solubility of the alkali metal hydroxide is best in these; the others that may be used include, for example, the higher molecular weight alcohols, benzene, xylene, etc. The amount of solvent used is not critical, it being necessary only to maintain the solubility of the reactants.

It is preferred to use approximately 10 to 15 percent molar excess of alkali metal hydroxide; however, up to 100 percent molar excess may be employed and also equimolar proportions may be employed. The time of reaction is not critical; it is generally preferred, however, to add the alcoholic solution of alkali metal hydroxide over a period of time in order to keep the exotherm under control. The time of addition is normally from about 30 minutes to 2 hours. After all the alkali metal hydroxide has been added, the reaction mixture is heated at reflux for from about 30 minutes to 5 hours, preferably around 4 hours.

Any extraction procedure known to the art may be employed, such as merely pouring the reaction mixture into the water and separating the oily product (the organic layer). Alternatively, if a more quantitative separation is desired, the organic layer may be extracted with the conventional water insoluble solvents, such as ether, benzene, etc.

The compound of the present invention finds utility as an insecticide fungicide or miticide. The compound of the present invention may also be used in the preparation of polymers which are, due to the high chlorine content, flame retardant in nature. The compound of the present invention may also be used as a flameproofing agent. In addition, the compound of the present invention finds utility as a chemical intermediate.

The following examples are given to illustrate the present invention and are not to be construed as limitative except as defined in the appended claims.

Example 1

Ninety-nine grams of liquid 1,4,5,6,7,7-hexachloro-2-(2,3-dichloroethyl)-bicyclo - (2.2.1) - heptene - 5 was dissolved in 300 cubic centimeters of ethanol. This solution was warmed with stirring to about 50 degrees centigrade. To the warmed solution was added an alcoholic solution containing 34 grams of potassium hydroxide (85 percent by weight). Addition was made in 1¼ hours. The reaction mixture was stirred at reflux for an additional 4 hours. The reaction mixture thus obtained was poured into water and extracted with methylene dichloride. After washing the organic layer and drying the solution over magnesium sulfate, the solvent was stripped and the residual oil fractionated. The compound 1,4,5,6,7,7-hexachloro-2-ethynylbicyclo-(2.2.1) - heptene - 5 was obtained boiling at 103 to 106 degrees centigrade at 1.5 millimeters pressure. The compound had empirical formula $C_9H_4Cl_6$ and the chlorine analysis was 65.6 percent calculated; 66 percent found.

Example 2

Five grams of 1,4,5,6,7,7-hexachloro-2-ethynylbicyclo-(2.2.1)-heptene-5 were dissolved in 10 grams of copolymerizable composition consisting of 44 percent styrene, and 56 percent of a polyester consisting of 1 mol of phthalic anhydride, 1 mol of fumaric acid and 2 mols of ethylene glycol. One percent of benzoyl peroxide was added as a polymerization catalyst. The resulting mixture was placed in a circulating oven at 80 degrees centigrade for about 18 hours. A clear resin was obtained which was self-extinguishing when ignited.

It is to be understood that the invention is not limited to the specific examples which have been offered merely as illustrative, and that modifications may be made within the scope of the appended claims without departing from the spirit of the invention.

I claim:
1. The process for preparing 1,4,5,6,7,7-hexachloro-2-ethynylbicyclo-(2.2.1)-heptene-5 which comprises heating 1,4,5,6,7,7-hexachloro - 2 - (2,3 - dichloroethyl) - bicyclo-(2.2.1)-heptene-5 in an alcoholic solution containing an alkali metal hydroxide.
2. The process according to claim 1 wherein the alcoholic solution containing an alkali metal hydroxide is ethanol containing potassium hydroxide.

References Cited in the file of this patent

UNITED STATES PATENTS

| | | |
|---|---|---|
| 2,649,485 | Taylor | Aug. 18, 1953 |
| 2,897,240 | Molotsky | July 28, 1959 |
| 2,908,732 | Tebboth et al. | Oct. 13, 1959 |

FOREIGN PATENTS

| | | |
|---|---|---|
| 777,141 | Great Britain | June 19, 1957 |